Sept. 29, 1959 G. H. MAUERHOFF 2,906,536

PROTECTIVE DISC FOR PHONOGRAPH RECORDS

Filed Feb. 1, 1955

INVENTOR
GAIRT H. MAUERHOFF

BY Townsend A. Beaman

ATTORNEY

United States Patent Office 2,906,536

Patented Sept. 29, 1959

2,906,536

PROTECTIVE DISC FOR PHONOGRAPH RECORDS

Gair H. Mauerhoff, Ann Arbor, Mich.

Application February 1, 1955, Serial No. 485,430

1 Claim. (Cl. 274—1)

The present invention relates to improvements in a protective accessory for phonograph records, being particularly concerned with an accessory capable of being associated between records and stacked upon the spindle of record changers now in extensive use upon phonographs.

According to the present invention, the accessory takes the form of a laminated disc having a rim of cushioning structure of one thickness and a central perforated portion of substantially less thickness so as to enable the disc to function upon the spindle of the record changer without interfering with its regular operation.

Thus, an object of the invention is to provide a cushioning and protective accessory for phonograph records during their use upon a record changer.

Another object is to provide a protective accessory for insertion between phonograph records upon a changer which assures the proper support of the record next in position upon the changer to be received upon the turntable.

A still further object of the invention is to provide a protective accessory to be disposed between adjacent phonograph records which separates the records from each other and improves the drive of stacked records from the turntable.

These and other objects and advantages residing in the combination, construction and arrangement of the component parts of the protective accessory will more fully appear from the following specification and claim.

Figure 3:
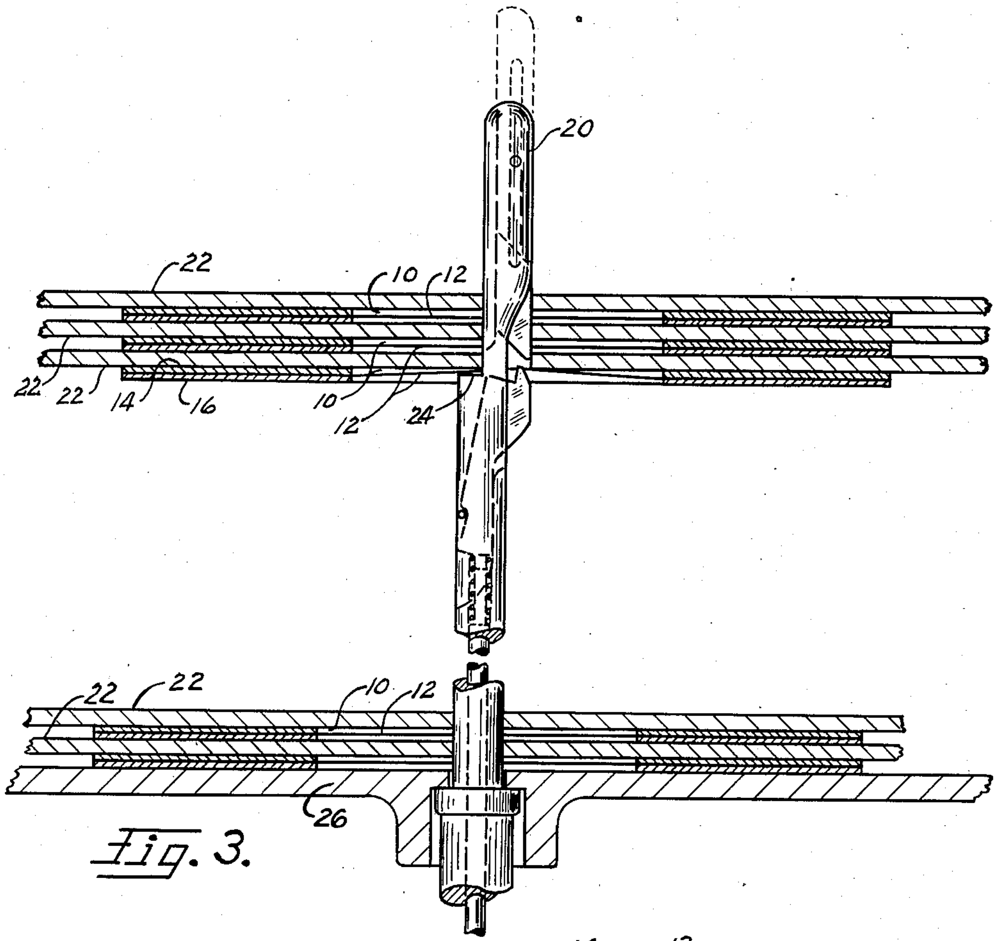
Fig. 3 is a fragmentary vertical cross-sectional view of a record changer spindle and turntable combination illustrating the use of the accessory.
Figure 2:
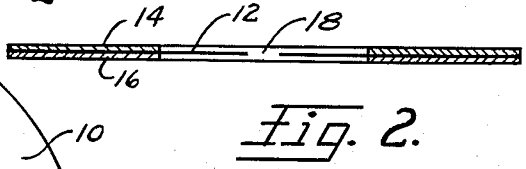
Fig. 2 is a cross-sectional view taken on line II—II of Fig. 1.
Figure 1:
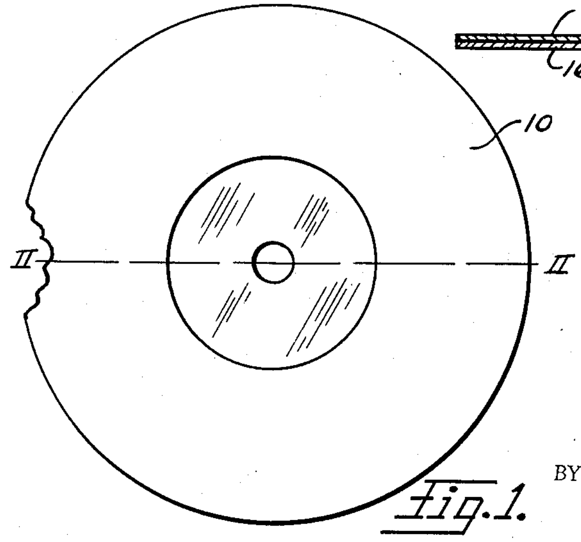
Fig. 1 is a plan view of the accessory.

The accessory in its preferred form comprises a laminated disc 10 having a thin intermediate portion 12 and a pair of outer face portions 14 and 16. The portion 12 has a centrally located hole 18 defined therein to receive the spindle 20 of the record changer and it is preferably of thin plastic sheet material or other suitable thin sheet stock having tough wear resisting properties so that the hole 18 will retain its shape in service. In practice, the thickness of the portion 12 will be in the order of .010" to .015". Portions 14 and 16 may be of soft paper stock having good cushioning properties in the order of blotting paper stock and, in practice, may be in the order of .032" to .050" in thickness. Many other materials may be used to give the desired cushioning and spacing bulk. The portions 12, 14 and 16 are suitably held together in any manner such as with an adhesive.

As shown in Fig. 3, the thickened outer portion of the disc 10 will support the adjacent records 22 substantially out of contact with each other and, thus, reduce scratching, surface scars and abrasion as well as ticks and clicks caused by stacking records upon the changer.

Because the portion 12 is extremely thin it will not interfere with the feeding of the record upon the spindle 20. As shown in Fig. 3, the disc 10 is always located directly below the record 22 supported on the ledge 24 awaiting release upon the turntable 26. Thus, if the hole of a record 22 is worn, the disc 10 will give proper support to the record 22 upon the spindle 20. Also, in addition to cushioning and protecting adjacent records, the disc 10 improves the drive between records 22 stacked upon the turntable 26.

Having thus described my invention what I claim as new and desire to protect by Letters Patent is:

An accessory for phonograph records comprising a disc of thin sheet stock perforated to receive the spindle of a record changer, and cushioning material of annular configuration secured to both sides of the disc coaxially thereof and spaced a substantial distance radially outwardly from the spindle perforation.

References Cited in the file of this patent

UNITED STATES PATENTS

| | | |
|---|---|---|
| 741,247 | Johnson | Oct. 13, 1903 |
| 1,480,629 | Nolen | Jan. 15, 1924 |
| 2,132,993 | Mitchell | Oct. 11, 1938 |

FOREIGN PATENTS

| | | |
|---|---|---|
| 811,877 | Germany | Aug. 23, 1951 |